Jan. 4, 1955  C. L. PEIRCE, JR., ET AL  2,698,471
WIRE CLAMP
Filed July 16, 1951  3 Sheets-Sheet 1
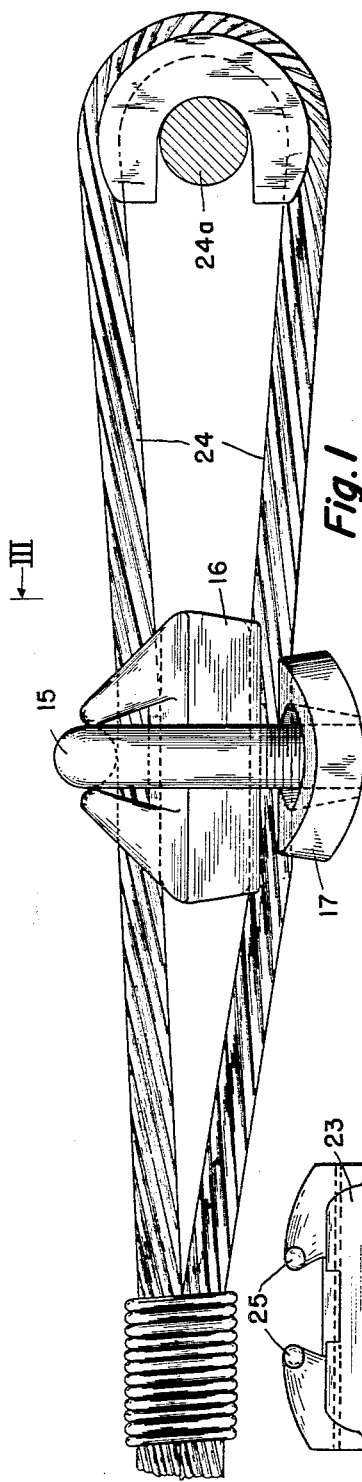
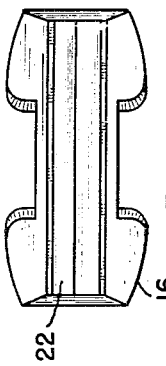
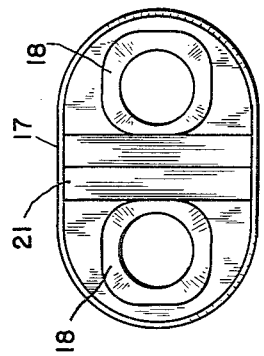
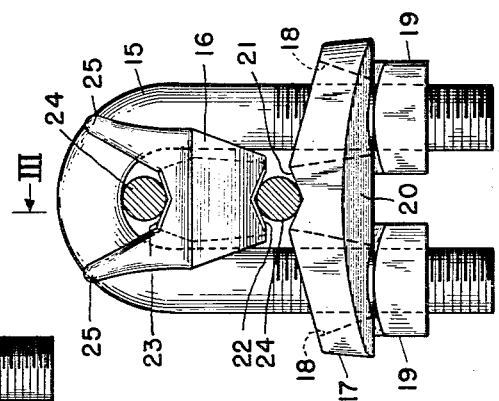
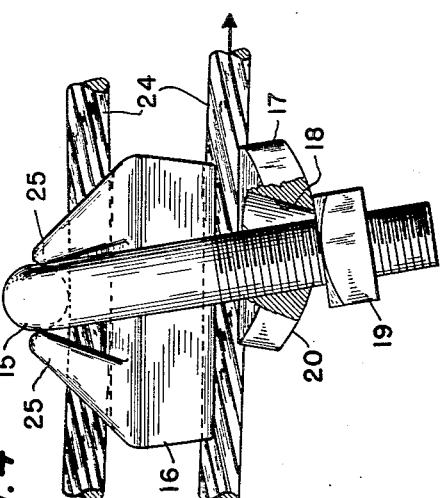
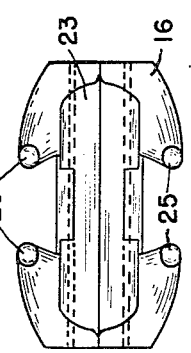
INVENTORS
Charles L. Peirce, Jr.
Andrew A. Hocher
BY
THEIR ATTORNEYS

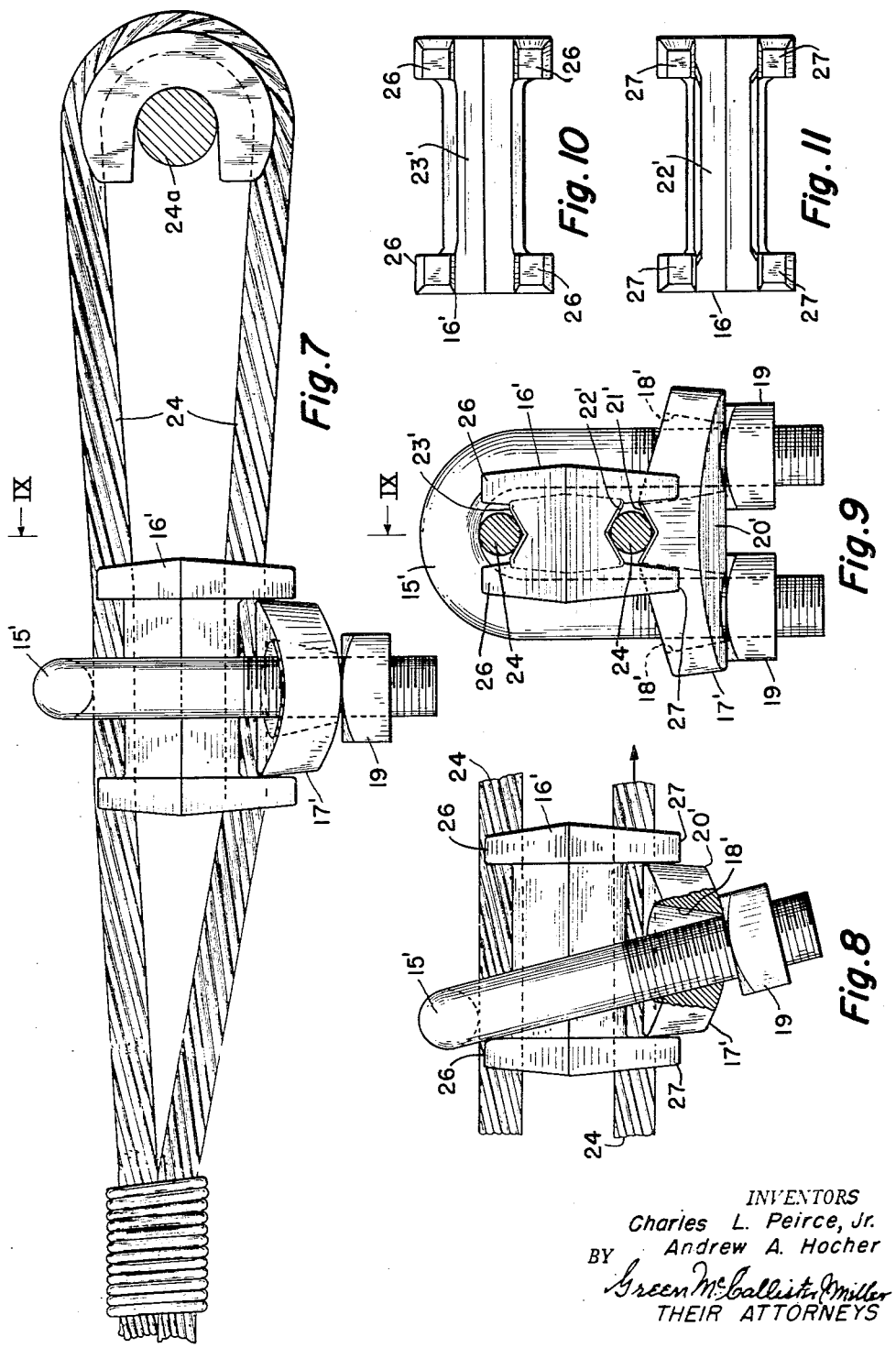

Jan. 4, 1955

C. L. PEIRCE, JR., ET AL 2,698,471

WIRE CLAMP

Filed July 16, 1951

INVENTORS
Charles L. Peirce, Jr.
Andrew A. Hocher
BY

THEIR ATTORNEYS

United States Patent Office 2,698,471
Patented Jan. 4, 1955

2,698,471
WIRE CLAMP

Charles L. Peirce, Jr., Pittsburgh, and Andrew A. Hocher, Glenshaw, Pa., assignors to Hubbard and Company, Pittsburgh, Pa., a corporation of Pennsylvania Application July 16, 1951, Serial No. 236,978

6 Claims. (Cl. 24—125)

This invention relates to clamps for use in connection with cables, rods, wires, and the like and has for an object to produce an improved clamp which is of simple construction, is of light weight yet durable, is easy to install and is highly effective in its clamping action.

A further object is to produce a clamp of the type designated, in which the members included in its make-up are of simple construction and so cooperate that they, in effect, constitute a unitary structure, both before and after being installed in a clamping relationship, and also respond to forces, acting upon the clamped parts, in such a way as to more effectively contribute to their clamping action than other clamps now on the market.

These and other objects which will be made more apparent throughout the further description of the invention are attained by clamps such as are herein illustrated and described.

Clamps somewhat similar to those of the present invention have been heretofore employed. In some such clamps the clamping action has been controlled to some extent by providing for relative movement between the members included in the make-up of the clamp, under conditions such that the relative movement was occasioned by opposed forces applied to the wires, cables or parts, subjected to clamping action. Clamps of the present invention are so formed and their component members are so related and so cooperate that relative motion between such members, occasioned by opposing forces applied to the parts clamped, is more effective in increasing the clamping action than is the case with prior clamps known to us.

This advantageous feature of clamping structures embodying our invention, is occasioned by a corelation of the members, going into the make-up of each structure, such that relative motion between such members, occasioned by the opposed forces imparted to the structure by the parts clamped thereto, occasions a tilting movement of one such member relative to the other members and around a fulcrum point which is substantially fixed with relation to one member of the structure and is so located that both the parts, subjected to the clamping action of the structure, lie between such fulcrum point and a clamping surface of the structure which engages the part to be clamped which is located remote from such fulcrum point. With such an arrangement of structural members, the force couple, occasioned by the tilting of one member of the structure, is greater than with any other arrangement of such members and, consequently, the tilting is most effective in contributing to the clamping action of the structure and in minimizing the relative movement between the members of the structure and in also minimizing the slipping of the parts to be clamped with relation to the structure.

Clamps of the general type here disclosed, are usually termed "wire clamps" although they may be employed in securing wires, rods, or cables together. All embodiments of our invention include at least three primary structural members which contribute to the clamping operation and which are normally capable of moving relatively to each other under strains imposed on them by force applied to at least one of the clamped parts and under conditions such that the movement thus occasioned increases their clamping action. One clamping structure which constitutes an embodiment of our invention includes a bolt member (illustrated as a U-bolt), a spacer or intermediate member which is located between and is engaged by both of the parts subjected to the clamping action of the structure, and a clamping jaw which cooperates with the spacer member in engaging and clamping one such part to the structure, and which is provided with bolt-receiving slots or apertures through which the bolt member extends and in which it is secured. The other part to be secured to the structure is engaged by the bolt member (or a jaw carried by it) and is held in clamped relationship between the bolt member and the spacer member. In all embodiments, the bolt member is secured to the jaw member, tiltable about a fulcrum point, located as previously described, and the clamping jaw (through which the bolt member projects) is so formed as to contribute to the tilting action of the bolt member whether or not the fulcrum point is directly associated with it or is independent of and spaced from it.

In the drawings accompanying and forming a part hereof Figure 1 is a side elevation of a clamp embodying our invention. The clamp is shown as applied to the looped end of a cable and the cable is illustrated as equipped with an abutment shield and as in anchoring position with relation to an anchoring abutment.

Figure 2 is a view partially in elevation and partially in section, of the clamp shown in Figure 1, but with the members thereof in relative positions to which they are capable of being moved by opposed forces imparted to them by the parts engaged thereby and clamped thereto.

Figure 3 is a sectional view taken along the line III—III of Figure 1.

Figure 4 is what may be termed the top plan view of the spacer member forming a part of the clamp shown in Figure 1 and Figure 5 is a plan view from the opposite side of the spacer member.

Figure 6 is a plan view of the jaw member forming a part of the clamp shown in Figure 1.

Figure 7 is a view corresponding to Figure 1, but illustrating a modified form of clamp embodying our invention.

Figure 8 is a view corresponding to Figure 2 and illustrating relative positions to which the members included in the make-up of the modified clamp may be moved by the action of the opposed forces imparted to the clamp, by the parts clamped thereto.

Figure 9 is a sectional view along the line IX—IX of Figure 7.

Figure 10 is a top plan view of the spacer member forming a part of the clamp illustrated in Figure 7, and Figure 11 is a plan view of the opposite side of that member.

Figures 12, 13:
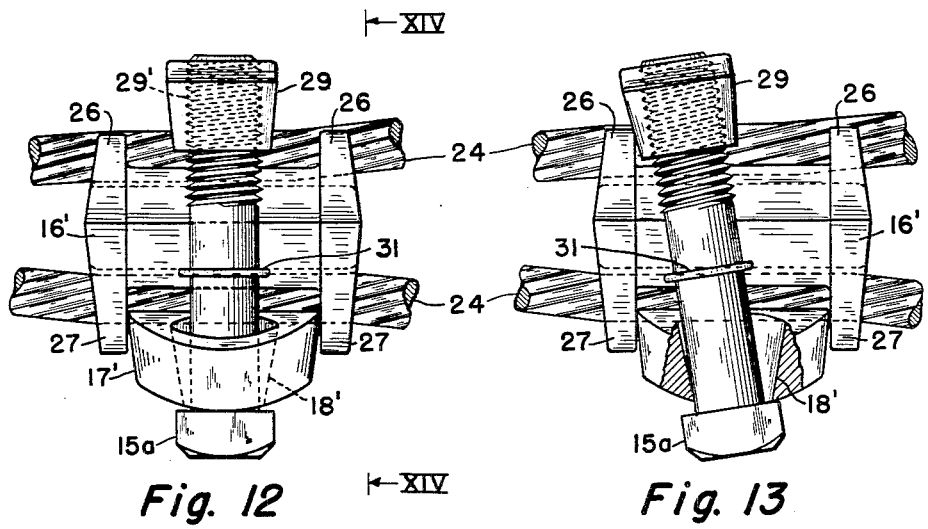
Figures 14, 15:
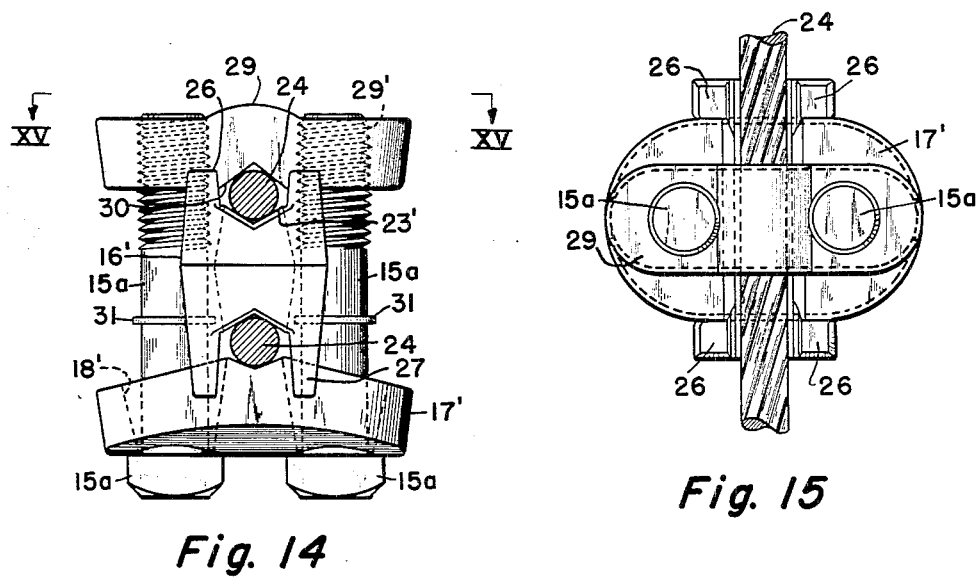

Figure 12 is a view corresponding to Figure 7 but illustrating a still further modified form of our invention; Figure 13 is a view of the last mentioned embodiment corresponding to Figure 8; Figure 14 is a sectional view along the line XIV—XIV of Figure 12 and Figure 15 is a top plan view of the clamp as illustrated in Figures 12 and 14.

Referring now to the embodiment of the invention illustrated in Figures 1 to 6 inclusive, the clamp includes as one of its component members, a bolt assembly shown as a U-bolt 15 and cooperating nuts. The clamp also includes a spacer member 16 and a jaw member 17. Each threaded end of the U-bolt projects through a separate aperture 18 formed in the member 17 and the nut 19 threaded onto the projecting end of each such leg, is adapted to bear against a rounded surface 20 formed on the jaw member and the nuts impart the clamping force to the members of the clamp structure. The opposite face of the member 17 is provided with a clamping surface shown in the form of a groove 21, adapted to receive a part to be clamped.

Throughout the further description, each rod, wire, cable or part thereof engaged by and secured to the clamp is referred to as "a part," and each surface of a clamping member which is adapted to engage any such part is sometimes referred to as a "part-engaging surface." That is to say, the surface of the groove 21 constitutes a part-engaging surface of the jaw 17.

The spacer member 16 is provided with two such surfaces, shown as grooves 22 and 23. These grooves are located on opposite faces of the member 16 and the groove 22 is adapted to cooperate with the groove 21 of the jaw member in holding a part in clamped relationship between the part engaging surfaces of the members 16 and 17. Likewise the groove 23 is a part engaging surface and is adapted to cooperate with the inner portion of the surface of the arched part of the U-bolt 15 in holding a part in clamped relationship between the U-bolt and the spacer member 16. In Figure 1 we have applied the numeral 24 to the separate parts of the wire loop associated with the clamp there illustrated, and we have also employed the numeral 24 throughout the various views of the drawings as indicating the parts secured together by the clamping action of the clamping members. The reference character 24a designates an anchor support for the cable loop of Figure 1.

It is important to note that the aperture 18 formed in the jaw 17 and through which the threaded ends of the U-bolt 15 extend, are tapered toward the outer or rounded surface 20 of the jaw member 17. As illustrated in Figure 2 this is for the purpose of accommodating tilting the U-bolt which may be occasioned by the opposed forces acting on the clamp structure and imparted to it by the parts secured thereto. The clamp illustrated in Figures 1 to 6 is such that movement of the bolt member 15, relative to the spacer member 16 is a tilting movement around a fulcrum point which is substantially fixed with relation to the spacer member 16. To accomplish this, the spacer member is provided with two pair of oppositely disposed wings 25 which perform the function of limiting the relative motion between the member 16 and the U-bolt 15, to a tilting movement on the part of the bolt, and of fixing the position of the fulcrum around which this tilting takes place. The wings 25 are also so located with relation to the groove 23, that they in effect form guiding surfaces which aid in directing a part to be clamped into that groove.

From this it is apparent that the wings are formed on and project from the side of the spacer member 16 which is remote from the jaw member 17 and that each wing is so located that the tip thereof is in close proximity to the arched portion of the U-bolt, i. e., the spacing between the tips of the opposed wings is substantially equal to the length of the diameter of the shank portion of the U-bolt 15. While the wings 25 of each pair diverge with relation to each other, the wings of one pair converge with relation to the wings of the other pair and it is this convergence which positions the tips of the wings in close proximity with the arched portion of the U-bolt and fixes the fulcrum point about which the bolt member 15 tilts.

When the three-part clamp is assembled, either before or after installation in association with parts to be clamped, the clearance between the tips of the wings and the U-bolt is normally such as will in effect fix the fulcrum point and also contribute to ease of assembly and disassembly. The spacing of the tips of the wings of the opposed pairs is also such as to loosely hold the spacer member 16 in assembled relationship with the bolt member 15 and the jaw member 17 when the ends of the U-bolt extend through the apertures 18 of the jaw member and are secured to the jaw member by the nuts 19. This contributes to ease of handling, since the separate members of the clamp can be initially assembled and then handled as a unitary structure up until the time they are disassembled as a preliminary to installing them on a wire or cable, which is so located as to require disassembly as a preliminary to securing the clamp thereto or to such other part or parts as are to be subjected to clamping action.

It will also be noted that the intermediate portion of the member 16 is of reduced section, and that this, in connection with the convergence of the wings of the opposed pairs and the taper of the apertures 18, facilitates the tilting of the bolt when the jaw member 17 is moved relatively to the member 16 by the pull of the parts located in the opposed clamping grooves 21 and 22.

Figure 2 illustrates the extreme position to which the bolt 15 may be tilted with relation to the member 16, by a pull in the direction of the arrow on the part 24 located between the members 16 and 17. It will be understood that a pull in the opposite direction of the part 24, engaging the jaw 17, will cause a swing of the U-bolt 15 in the opposite direction. A tightening of the nuts 19 will render all the part-engaging surfaces effective as clamping surfaces and the part-gripping capacity of such surfaces will be increased as the nuts are tightened and also as the bolt is tilted from the position shown in Figure 1 toward a position such as shown in Figure 2.

In Figures 7, 8 and 9 we have illustrated a modified form of clamp which embodies our invention. The clamp is illustrated in connection with a cable loop shown as passing around and secured to an anchor member 24a. The parts of the cable loop are indicated by the numerals 24—24 and, as in Figure 1, the members of the clamp are shown in the initial installed position, in which the members are free of the effect of external forces which may be applied to them by the parts clamped to them. In Figure 8, the members of the clamp are shown in the extreme relative positions to which they may be moved by such external forces.

While the modified form of clamp includes the three fundamental parts, viz., a bolt assembly 15', a spacer member 16' and a jaw member 17', it differs from the previously described clamp in that relative movement between the members 15', 16' and 17' is limited to a tilting of the bolt assembly 15' about a fulcrum point closely associated with the jaw member 17', and variations in the diameter of the clamped parts 24 have no effect in shifting the position of the fulcrum point longitudinally with relation to the part 17'.

Another fundamental difference between the clamp illustrated in Figures 1 to 6 and the clamp illustrated in Figures 7 to 11, is that the last mentioned clamp is such as to prevent appreciably relative longitudinal movement between the members 16' and 17'. This is occasioned by the fact that the spacer member 16' differs materially from the spacer member 16 in that it is not provided with wings which correspond in position and function to the wings 25, but is provided with four pair of lugs, viz., two pair of lugs 26 and two pair of lugs 27. One pair of each set of these lugs is located at one end of the member 16' and the other pair of each set is located at the other end of that member.

The member 16' is provided with two part-receiving grooves 22' and 23' which correspond in location and function to the grooves 22 and 23 of the member 16. The lugs 26 of each pair are located on opposite sides of the groove 23' and the lugs 27 of each pair are correspondingly located with relation to the groove 22', as clearly shown in Figure 9.

Each of the lugs 27 is of such length that it extends beyond the part 24 located within the groove 22' and independently of the diameter of that part. This is for the purpose of limiting the relative longitudinal motion between the intermediate member 16' and the jaw member 17'. As a result, the jaw member is of such width that when in clamping relationship with the intermediate member 16 it slidably engages the inner faces of all four lugs 27. As disclosed by Figure 8, the term "inner faces" is employed to designate the faces of the lugs 27 of each pair which are opposite to the corresponding face of the lugs of the other pair. Figures 7 and 8 also disclose that these inner faces are preferably plane faces and extend at right angles to the longitudinal axis of the groove 22'. With such a relationship between the jaw member 17' and the lugs 25, it is apparent that variations in the diameter of the part or parts 24 to be clamped, will shift the relative positions of the clamping surfaces of the jaw member and the bolt assembly with relation to the clamping surfaces of the grooves 22' and 23' but will not occasion any variation in the relative longitudinal movement between the jaw member and the intermediate member 16'.

The jaw member 17' is similar in many respects to the jaw member 17. Each bolt-receiving aperture 18' is not only tapered to accommodate the tilting movement of the bolt assembly 15' with relation to the jaw member but its dimensions are such that the small end thereof in effect designates the position of the fulcrum axis about which the bolt assembly tilts, with relation to the jaw member and independently of the diameter of each of the parts 24 held in clamping position by the assembled clamping structure. The jaw member 17' is provided with a part-receiving groove 21', corresponding in position and function to the groove 21 of the jaw member 17, and the outer surface 20' of the member 17' is curved to accommodate the varying positions of the nuts 19 which form a part of the bolt assembly 15'.

Because of the similarity between the members 17 and 17' we have omitted a plan view of the member 17'. It will, however, be understood that some differences in dimensional details may exist between the two jaw members. It will also be understood that the straight lateral edges of the member 17' on the opposite sides of the groove 21' are the portions of the jaw member 17' which are engaged and guided by the plane faces of the lugs 27. The lugs 26 of the jaw member 17' cooperate with, or may act independently of the tapered surfaces of the apertures 18' in limiting the amplitude of the tilting movement of the bolt assembly 15'. While Figure 8 illustrates the bolt assembly in one of the two extreme positions to which it may be shifted by force or forces exerted on the clamping structure by the parts 24 secured thereto, it should be noted that while the relative positions of the parts there illustrated are possible they are seldom reached where the nuts 19 are adjusted to a position on the U-bolt which contributes to effective clamping of the parts 24 associated with it.

In Figures 12 through 15 we have shown a still further embodiment of our invention which in many respects is similar to the embodiment just illustrated. The primary difference is in the bolt assembly illustrated in the last mentioned figures of the drawings. This third embodiment of our invention includes the three primary elements, viz., the intermediate member, the jaw member and the bolt assembly. The bolt assembly is, however, made up of two bolts 15a which are similar to each other, and a tie member 29 which is provided with two tapped apertures 29', each adapted to receive the threaded end of one of the bolts 15a. The tie member is also provided with part-receiving groove 30 which, as shown in Figure 14, cooperates with the groove 23' in clamping one of the parts 24 to the clamping structure.

The intermediate member and the jaw member of this third modification of our invention, may be exactly similar to the intermediate member and the jaw member shown in Figures 7, 8 and 9, and for this reason we have applied to them the reference characters employed in those figures.

One of the advantages of all the embodiments of the invention is, as pointed out in connection with the embodiment of Figure 1, that the parts constitute a unitary structure when assembled either prior to employing them in a clamping operation or when they are so employed. Thus when the bolt assembly, the intermediate element 16' and the jaw member 17' are assembled, the structural details of the elements are such as to prevent accidental removal of any of them. This is made apparent by Figures 12 to 15. As there shown the bolt assembly is attached to the jaw member 17' and the intermediate portion 16' is so formed that it is held in place by the tie member 29, the jaw member 17' and the bolts 15a and, as pointed out, the lugs 27 normally engage the jaw member 17' and materially limit the relative movement between it and the intermediate member. In addition, each end portion of the member 16' is wider than the intermediate portion thereof and is also wider than the space between the bolts 15a. Thus, while the bolts 15a are tiltable with relation to the members 16' and 17', they cooperate with the jaw member and tie member in holding the member 16' in place within the assembly.

This particular embodiment of the invention has the added advantage that it may be placed in clamping engagement with an installed part such as a guy wire, without disassembling its elements. This is a decided advantage over the other embodiments, since a lineman working on a pole is usually wearing gloves and has difficulty in disassembling and then assembling the separate parts of a clamp in the operation of installing it in clamping relationship with guy wires and similar parts. With the last mentioned embodiment of our invention, he can loosen one bolt 15a from the tie member 29 and in this way install the guy wire in place within the part-receiving grooves 23' and 30 without disassembling all of the elements of the clamp. It will also be apparent that if the threads of one of the bolts 15a are rolled threads instead of cut threads, their diameter will be somewhat larger than the shank of the bolts. This may be taken advantage of by employing a resilient wire ring 31 on such bolt. The wire ring will preferably be made of such diameter that when sprung over the rolled threads it will loosely fit the shank of the bolt and in this way prevent the bolt, which has been loosened from its cooperating tie member 29, from dropping free of the jaw member 17'.

It will also be apparent that a spring ring such as described, can also be employed with bolts even though the threads thereof are cut threads. This can be accomplished by forming the ring so that it grips the shank portion of the bolt when in place thereon. With such an arrangement the loosening of one of the bolts from its tie member will not free the bolt or any portion of the clamp structure, thus providing a structure which will simplify operations on the part of the lineman during installation and removal of the clamp structures.

From the foregoing it is apparent that each embodiment of our invention is based on the principle of limiting relative movement between the fundamental members of the clamping structure and in controlling such relative movement of those members as results from force transmitted to the clamp structure by pull of the parts clamped thereto, and in so controlling that movement as to most effectively employ the force couple developed thereby in preventing slipping of the clamped parts with relation to the clamping structure.

While we have disclosed several embodiments of our invention, it will be apparent that changes, additions to and omissions from the structural details disclosed may be made without departing from the spirit and scope of the invention as defined by the appended claims.

What we claim is:

1. In combination in a three-part wire clamp, an intermediate clamping member having two part-engaging surfaces each in the form of a groove located in one of two oppositely disposed faces thereof; a jaw member having a part-engaging surface in the form of a groove formed in the side thereof adjacent said intermediate member and a rounded seat formed on the opposite side thereof; a bolt assembly member straddling said intermediate member, operatively secured to said jaw member with portions thereof seated on the seat of said jaw member and having a part-engaging surface cooperating with one of the grooves of said intermediate member; said intermediate member having oppositely disposed pairs of wings integrally formed thereon with the pairs located at opposite ends of said member and with a wing of each pair located on each side of the wire-receiving groove of the intermediate member which is remote from said jaw member, and extending outwardly from said intermediate member in a direction away from said jaw member and with the wings of each pair diverging with relation to each other and with each wing of each pair converging toward a wing of the opposed pair and projecting into engaging relationship with said bolt assembly at points adjacent to the part-engaging surface thereof.

2. A wire clamp comprising an intermediate clamping member having a separate part-engaging surface extending longitudinally along each of two opposite sides thereof; a jaw member located adjacent said intermediate member and having a part-engaging surface formed thereon and located in cooperative relationship with one such surface of said intermediate member; a U-bolt clamping member straddling said intermediate member, positioned intermediate the ends thereof, removably secured to said jaw member and having a part-engaging surface positioned opposite to and in cooperative relation with the second of said part-engaging surfaces of said intermediate member; and a separate pair of wings located adjacent each end of said intermediate member, with the wings of each pair located on opposite sides of said last mentioned part-engaging surface and extending beyond said surface and with each wing of one pair converging toward a wing of the other pair and with each such wing projecting into close proximity with the arched portion of said U-bolt.

3. A wire clamp comprising an intermediate clamping member having a separate part-engaging surface extending longitudinally along each of two opposite sides thereof; a jaw member located adjacent said intermediate member and having a part-engaging surface formed thereon and located in cooperative relationship with one such surface of said intermediate member; a U-bolt clamping member straddling said intermediate member, positioned intermediate the ends thereof, removably and adjustably secured to said jaw member and having a part-engaging surface positioned opposite to and in cooperative relation with the second of said part-engaging surfaces of said intermediate member; and a separate pair of U-bolt engaging wings formed integrally with and located adjacent each end of said intermediate member, with the wings of each such pair located on opposite sides of said second part-engaging surface diverging with relation to each other and with each such wing projecting beyond each such surface and into close proximity with the arched portion of said U-bolt.

4. A wire clamp comprising an intermediate clamping member having a separate part-engaging surface extending longitudinally along each of two opposite sides thereof; a jaw member located adjacent said intermediate member and having a part-engaging surface formed thereon and located in cooperative relationship with one such surface of said intermediate member; a U-bolt clamping member straddling said intermediate member, positioned intermediate the ends thereof, removably secured to said jaw member and having the part-engaging surface located within the arched portion thereof and positioned opposite to and in cooperative relation with the second of said part-engaging surfaces of said intermediate member; and two pair of oppositely disposed wings formed as a unitary part of said intermediate member with wings of each such pair located on opposite sides of said second part-engaging surface, diverging with relation to each other and projecting beyond said surface into close proximity with the arched portion of said U-bolt.

5. In a three-part wire clamp, an intermediate spacer member having a separate wire-engaging groove formed in the surface of two of its opposite sides; a jaw member located adjacent one of the sides of said spacer member and having a wire-engaging groove formed in the surface thereof adjacent said spacer member and extending substantially parallel to the groove of such member; said jaw member having two bolt-receiving apertures formed therein, each tapered toward the side thereof remote from said spacer member; and a U-bolt straddling said intermediate member, with the legs thereof extending through the bolt-receiving apertures of said jaw member and adjustably secured to said member; in combination with oppositely disposed pairs of wings integrally formed on said spacer member with a wing of each pair located on each side of the wire-receiving groove of said spacer member remote from said jaw member and extending outwardly from said spacer member in a direction away from said jaw member and with the wings of the opposed pairs converging toward each other and with each such wing projecting into engaging relationship with said U-bolt at points adjacent the arched portion thereof.

6. In combination in a wire clamp including an intermediate spacer member having a separate wire-engaging groove formed in each of two opposed sides thereof with each such groove extending longitudinally of said member; a jaw member movable relatively to said spacer member, located adjacent thereto and having a wire-engaging groove formed in one side thereof, extending parallel to and cooperating with one of the wire-engaging grooves of said spacer member; said jaw member also having two bolt-receiving apertures formed therein in spaced relationship to each other, each being tapered toward the side of said jaw member remote from said spacer member; a bolt assembly having a wire-engaging surface located opposite to and in cooperative relation with the wire-engaging groove of said spacer member remote from said jaw member and with the bolt parts of said bolt assembly straddling said spacer member and with each such part extending through one of said bolt-receiving apertures of said jaw member and adjustably secured to said jaw member; and oppositely disposed pairs of wings integrally formed with the body portion of said spacer member with one such pair adjacent one end and with the other such pair adjacent the other end of said spacer and with a wing of each such pair located on opposite sides of the wire-engaging groove of said spacer member remote from said jaw member and diverging relatively to the other wing of such pair, and with both wings of each pair projecting beyond such groove, converging with relation to the wings of the other pair and with the end of each such wing extending into engaging relationship with said bolt assembly to thereby limit the tilting movement of said bolt assembly, relatively to said spacer member, to a movement about a fulcrum point remote from said spacer member and located between the ends of the opposed pairs of wings.

References Cited in the file of this patent

UNITED STATES PATENTS

| Number | Name | Date |
|---|---|---|
| 1,233,366 | Keator | July 17, 1917 |
| 1,584,848 | Clowes | May 18, 1926 |
| 1,811,154 | Reilly | June 23, 1931 |
| 2,046,247 | Chandler | June 30, 1936 |
| 2,327,307 | Jenne | Aug. 17, 1943 |
| 2,348,100 | Wadsworth | May 2, 1944 |

FOREIGN PATENTS

| Number | Country | Date |
|---|---|---|
| 177,370 | Switzerland | Mar. 7, 1933 |